United States Patent

Cuny et al.

[11] Patent Number: 6,016,378
[45] Date of Patent: Jan. 18, 2000

[54] ADAPTABLE ASSEMBLY OF STACKED AND HINGED FLAT MODULES

[75] Inventors: Christian Cuny, Marolles En Hurepoix; Alain Vincent, Juilly, both of France

[73] Assignee: Alcatel, Paris, France

[21] Appl. No.: 09/039,234

[22] Filed: Mar. 16, 1998

[30] Foreign Application Priority Data

Mar. 17, 1997 [FR] France .................................. 97 03179

[51] Int. Cl.[7] ...................................................... G02B 6/00
[52] U.S. Cl. ............................ 385/135; 385/134; 385/136
[58] Field of Search .................................. 385/134, 135, 385/136, 137, 138, 139

[56] References Cited

U.S. PATENT DOCUMENTS 4,995,688  2/1991  Anton et al. ............................. 385/135
5,323,478  6/1994  Milanowski et al. .................... 385/135

FOREIGN PATENT DOCUMENTS

0557187A1  8/1993  European Pat. Off. ............... 385/135
2687743A1  8/1993  France .................................... 385/135

*Primary Examiner*—Phan T. H. Palmer
*Attorney, Agent, or Firm*—Sughrue, Mion, Zinn Macpeak & Seas, PLLC

[57] ABSTRACT

An adaptable assembly of hinged and stacked flat modules includes n modules and a support for holding the modules to which they are hinged, the support including successive elementary parts and hinges between them. The support comprises at least one modular support having one of the elementary parts at a first end and a truncated additional part at its second end which can be engaged in the elementary part at the first end of another identical modular support. Applications include assembly of optical cassettes.

10 Claims, 3 Drawing Sheets

ADAPTABLE ASSEMBLY OF STACKED AND HINGED FLAT MODULES

BACKGROUND OF THE INVENTION

1. Field of the Invention

The present invention concerns an adaptable assembly of flat modules which are stacked one on the other and individually hinged about one edge.

The modules are in particular cassettes for stowing and/or splicing optical fibers. Each of them is made accessible within the assembly by pivoting the modules above that concerned about their individual hinge axes.

2. Description of the Prior Art

Document U.S. Pat. No. 5,323,478 describes an assembly of such modules mounted on a support adapted to extend the height of the stacked modules and to hold the modules, which are hinged to it. The support has successive identical elementary parts which hold the various stacked modules and hinge axes between said elementary parts for the various modules held on the latter. The elementary parts also have abutments which limit to substantially 90° the pivoting of the modules relative to each other about their hinge axis.

In a first embodiment described in the above document the support is a one-piece molded component the elementary parts of which are connected to each other in sequence by thinner sections of the support to constitute the hinge axes of the stacked modules held on the support. A one-piece support of this kind is designed for a given number of stacked modules. It cannot be adapted to a different number of modules and in particular a number greater than the aforementioned given number. The abutments on each of the elementary parts of the support define two intersecting flats at 45° and the edge where they merge is parallel to the hinge axes. The abutments project from the face of the elementary part opposite that holding one of the modules.

In a second embodiment described in the above document the elementary parts of the support are initially independent and are fastened together in sequence by two assembly strips fixed to each of them and defining the hinge axes between them. The resulting support is similar to the support of the first embodiment in that it is designed for a given number of modules and cannot be adapted to suit a different number of modules. The abutments are similar to those of the first embodiment.

In a third embodiment also described in the above document the elementary parts are initially independent and include complementary means on each of them for assembling them and simultaneously providing hinge axes. The complementary means are assemblies of lugs transverse to each elementary part on its face opposite that holding one of the modules and these lugs are provided with a cylindrical finger on one of the lugs of each assembly and a corresponding hole on the other. Thus cylindrical fingers on one of the parts can be nested in holes on the other, thereby assembling them together and defining the hinge axis between them. The abutments are then formed by at least one boss and at least one corresponding imprint on the lugs around the finger or around the hole, respectively. A support of this kind can be adapted to suit a varying number of stacked modules in the assembly, by adding or removing elementary parts of the support at will. It is not entirely satisfactory from the mechanical point of view, however, because of the means that are used both to assemble the elementary parts of the support and to hinge the modules and because of the construction of the abutments that such means require.

An aim of the present invention is to benefit from the advantages of the various embodiments mentioned above and to avoid their drawbacks.

SUMMARY OF THE INVENTION

The present invention consists in a modular assembly of hinged stacked flat modules comprising n substantially identical modules and a support for holding the modules and to which they are hinged, where n is an integer greater than 1, the modules have two larger stacking faces and smaller peripheral faces and retaining means on a first of their smaller faces, and the support has a length at least equal to the height of the stacked modules and includes successive and non-contiguously superposed elementary parts, hinges between them, second retaining means complementary to the first means and on each of them for holding one of the modules on an assembly face of each elementary part, abutments projecting from the face opposite the assembly face of the elementary parts, and at least one modular support having one of the elementary parts at a first end and a truncated additional part at its opposite second end, the truncated additional part being engageable in the elementary part of the first end of another identical modular support.

The above assembly can also have at least one of the following additional features:

the abutments on the elementary part of the first end of each modular support are hollow and open onto the assembly face of the elementary part.

the truncated additional part of each modular support includes projecting studs analogous to the abutments on each elementary part but shorter than them and projecting less far.

the abutments include internal ribs for retaining by wedging the truncated additional part in the elementary part at the first end of the other modular support.

the assembly includes a member for locking the truncated additional part in the elementary part of the other modular support, the member being one of the modules held on the assembly face of the elementary part.

the assembly has an even number of successive elementary parts, this even number being in particular 2.

The features and advantages of the present invention will emerge from the description of a preferred embodiment shown in the appended drawings.

DETAILED DESCRIPTION OF THE PREFERRED EMBODIMENTS

Figure 1:
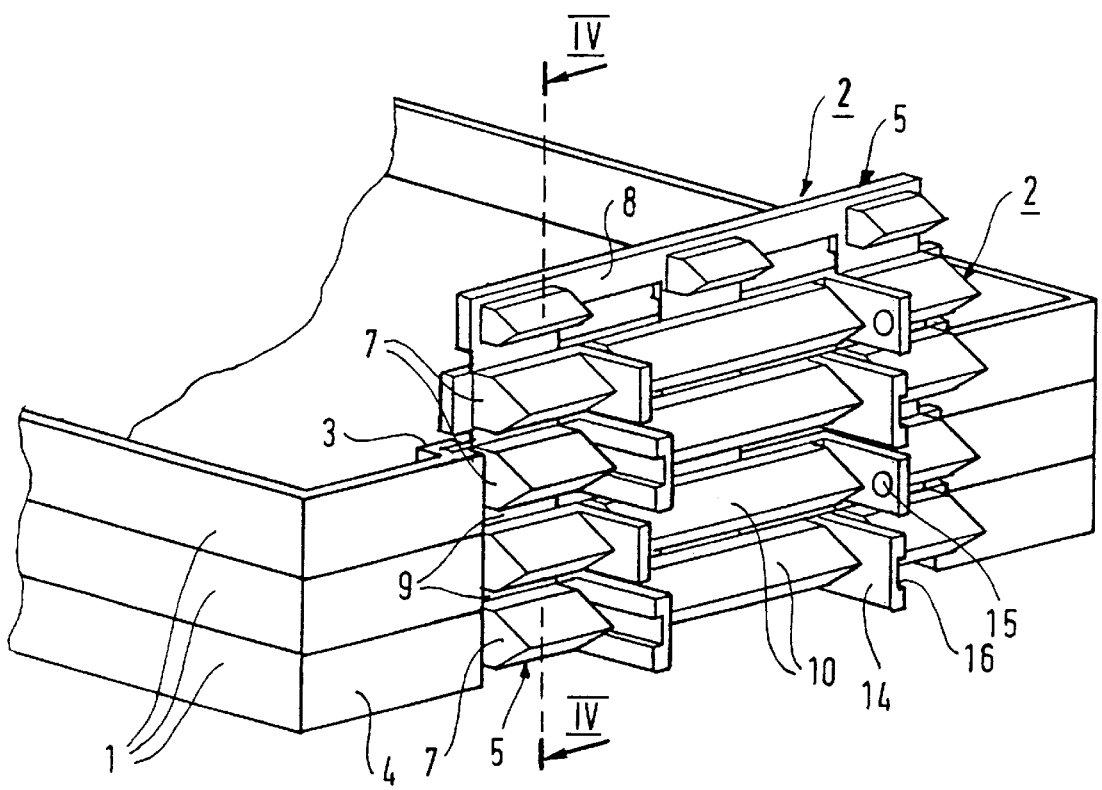
FIG. 1 is a partial perspective view of an assembly in accordance with the invention.

Referring to FIG. 1, the assembly shown comprises n stacked identical flat modules 1 and a support 2 for holding the modules and to which they are hinged. In this embodiment n=3.

The modules 1 have a rectangular overall shape. They are in particular cassettes for stowing and/or splicing optical fibers or can be other stackable items where access to each item is required without disassembling the stack.

The larger sides of the modules are superposed to construct a stack of modules. Retaining means 3 are provided on a first smaller peripheral face 4 to hold each module onto the support 2. The means 3 comprise two angle-brackets in a face-to-face arrangement on the first smaller face, symmetrical to each other about the median transverse axis of that face. The two angle-brackets extend the width of the smaller face 4 of each module. They are defined between the median portion and the two terminal portions of the smaller face, the terminal portions and the angle-brackets slightly extending them projecting externally from the median portion of the smaller face.

Figure 2:
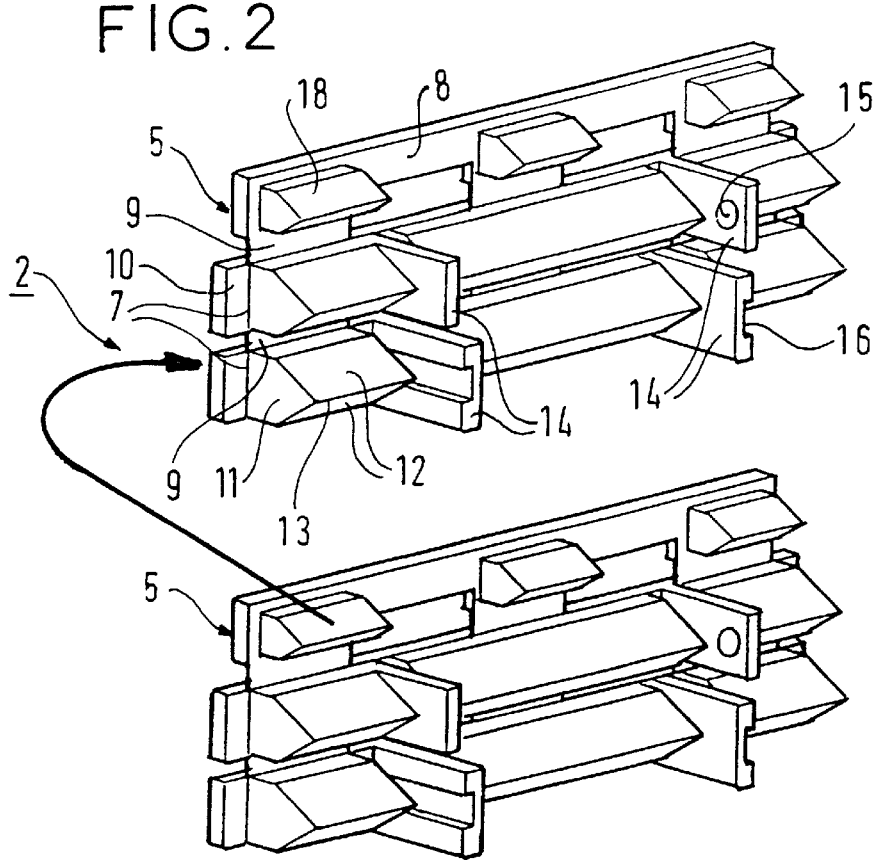
FIG. 2 is an exploded front perspective view of modular supports constituting a final support of said assembly from FIG. 1.
Figure 3:
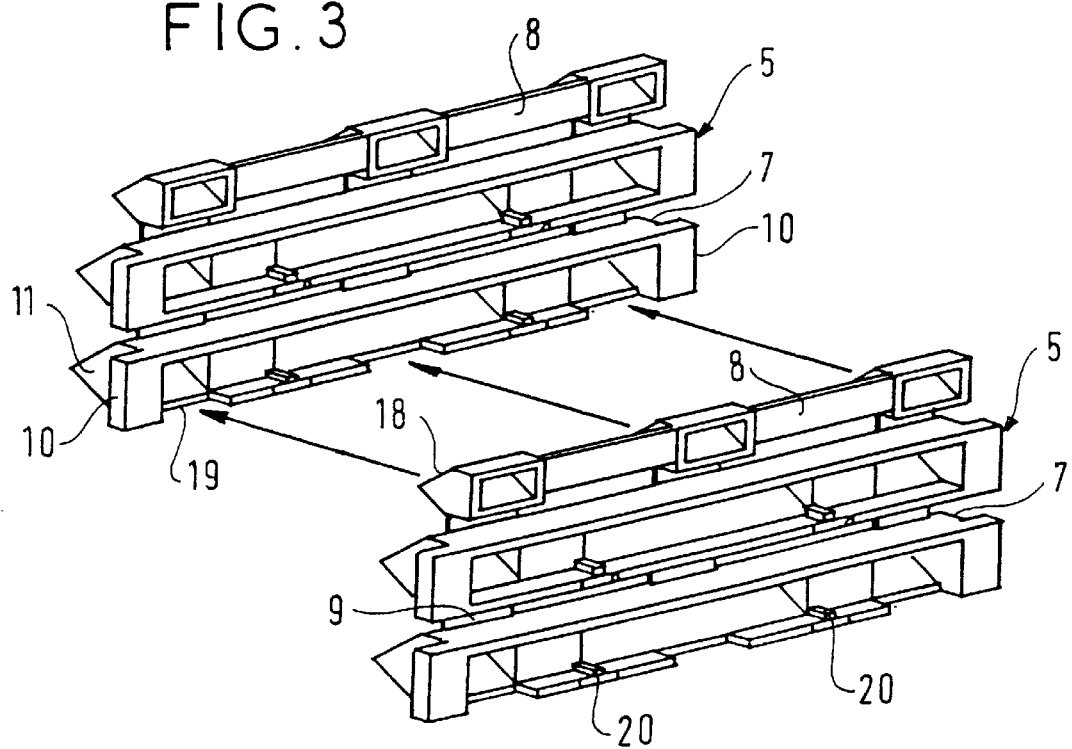
FIG. 3 is a view analogous to FIG. 2 but as seen from the opposite side.

The support 2 is formed of two modular supports 5 assembled together, shown in the unassembled state in FIGS. 2 and 3. It has a particular length which is at least equal to the height of the stack of n modules. Consequently it includes the number of modular supports needed to obtain this length suited to the number n of modules.

Figure 4:
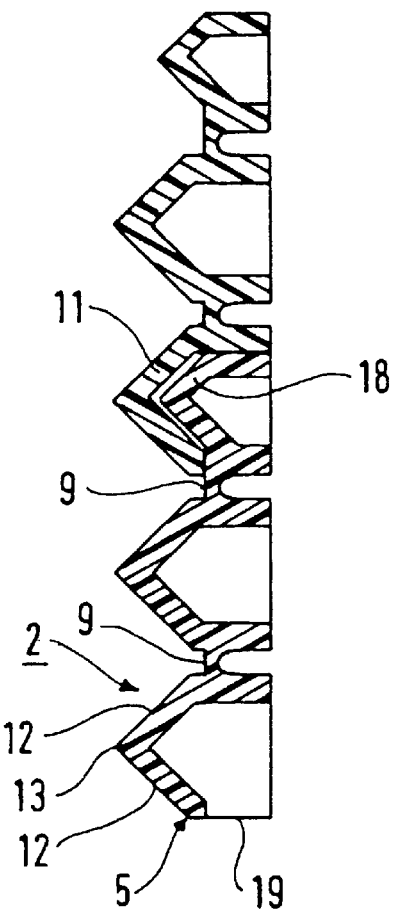
FIG. 4 is a sectional view of said final support.

Referring to FIG. 1 and more particularly to FIGS. 2, 3 and 4, it can be seen that the modular supports 5 are identical, with the possible exception of additional lugs for fixing to a baseplate that can be provided on the bottom modular support and are not shown in the figures. In this embodiment each support is adapted to hold and to hinge two of the n modules 1.

Each of the modular supports 5 has two elementary parts 7 which are superposed but not contiguous and each of which holds one of the two modules 1, one of the elementary parts being a terminal part. It has an additional part 8 truncated relative to the elementary parts and constituting the terminal part on the side opposite the terminal part. Two hinges 9 between the three superposed parts connect them together. The hinges 9 constitute the hinge axes of the two modules 1 held on the respective two elementary parts 7. They are defined by thinner sections between the parts 7 and 8. By nesting in the terminal elementary part 7 of another modular support, the truncated additional part 8 enables the modular support to be connected to the latter.

Each elementary part 7 has an elongate shape parallel to the hinges 9. Its length is equal to the distance between the two angle-brackets 3 on the modules 1. It has two terminal lugs 10 received and held in the angle-brackets 3 for holding the module against an assembly face of the elementary part of the modular support and of the resulting support.

The elementary parts 7 further include abutments 11 projecting from the face opposite the assembly face. The abutments are hollow and open onto the assembly face. They define two flats 12 inclined at 45° and intersecting at an edge 13 parallel to the hinges. The abutments are discontinuous along the length of the elementary parts 7 and are divided into a median abutment and two lateral abutments on each of the latter. Each elementary part further includes locking lugs 14 between the median abutment and each lateral abutment. The locking lugs on one of the two elementary parts are complementary to and slightly offset in the longitudinal direction relative to those on the other part. There is a semi-circular boss 15 on one of them and a corresponding housing 16, such as a groove, on the other one.

The bosses 15 of the locking lugs are received into the grooves 16 of the complementary lugs when the abutments 11 of the two elementary parts are in bearing engagement with each other, i.e. when one of the elementary parts 7 has pivoted 90° relative to the other about the hinge between them. They interlock in this pivoted by 90° position and this renders this position stable. It is sufficient to force the bosses 15 out of the grooves 16 to enable pivoting in the opposite direction.

The truncated additional part 8 is similar to the elementary part 7 expect that it has no terminal lugs for retaining a module and no locking lugs. It is adapted to engage entirely within the terminal elementary part 7 of another modular support. It has projecting studs 18 which project less than and are shorter than the abutments 11 so as to engage therein via the assembly face of the terminal elementary part concerned. The elementary part further has notches 19 at the base of its abutments 11 on the same side as the end of the modular support and facing the hinges 9 connected to the truncated additional part 8. Additionally, internal ribs 20 are provided in the assembly face. They constitute slight obstacles to engagement of the truncated additional part in the elementary part and its withdrawal therefrom.

The assembled modular supports 5 are interlocked by mounting one of the modules on the elementary part in which the truncated additional part is engaged. The modular supports when assembled and interlocked in this way are in all respects equivalent to a continuous single support. The hinges 9 between the truncated additional part and the adjacent elementary part constitute the hinges between this elementary part and the terminal elementary part of the other modular support assembled to the first.

Figure 5:
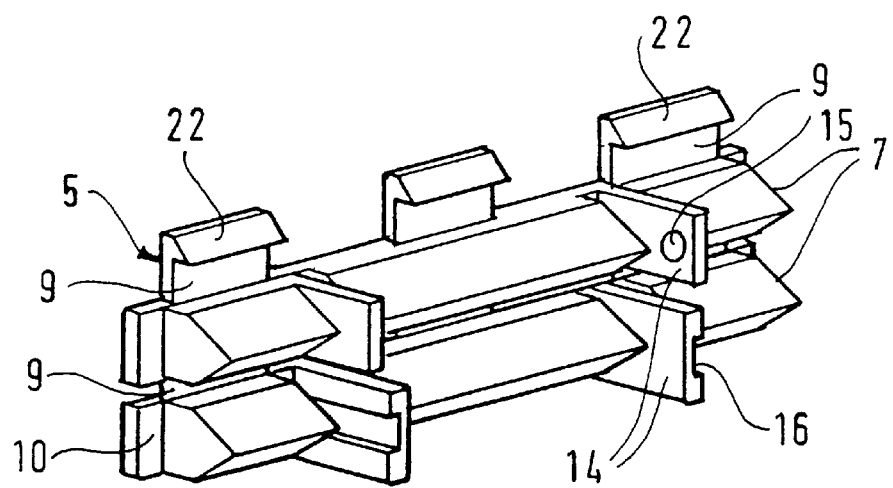
FIG. 5 is a perspective view of an alternative embodiment compared to FIG. 2.

FIG. 5 shows a different embodiment of the modular support 5. The essential difference concerns the truncated additional part, which is divided into individual teeth 22. The teeth extend the individual hinges 9 attached to the adjacent elementary part 7. Their end is analogous to a half-stud like one of the previously mentioned studs 18. The teeth 22 are likewise held wedged inside the abutments 11 of the terminal elementary part of another modular support by the previously mentioned ribs 20. They are locked-in place by the module mounted on this terminal elementary part.

The advantage of the modular supports 5 which can be assembled in the above manner is that, once assembled, they are equivalent to a one-piece single support but one having a length which can be adapted to suit the number of modules in the assembly.

In a variant of the embodiments of FIGS. 2 and 3 of FIG. 5 the modular supports 5 can have only one elementary part 7 or three or more elementary parts 7. On the other hand, as previously, each has a truncated additional part that can be engaged in the terminal elementary part of another modular support The advantage of modular supports having an even number of elementary parts 7 is that the latter are all identical, including for the purposes of locking in the maximum pivoted position obtained by the pairs of complementary lugs, like the lugs 14, provided for this purpose.

There is claimed:

1. A modular assembly of hinged stacked flat modules comprising n substantially identical modules and a support for holding said modules and to which they are hinged, where n is an integer greater than 1, said modules have two larger stacking faces and smaller peripheral faces and first retaining means on a first of their smaller faces, and said support has a length at least equal to the height of said stacked modules and includes successive and non-contiguously superposed elementary parts, hinges between them, second retaining means complementary to said first retaining means on each of them for holding one of the modules on an assembly face of each elementary part, abutments projecting from the face opposite the assembly face of the elementary parts, and at least one modular support having one of said elementary parts at a first end and a truncated additional part at its opposite second end, said truncated additional part being engageable in the elementary part of said first end of another identical modular support.

2. The assembly claimed in claim 1 wherein said truncated additional part of each modular support includes projecting studs analogous to said abutments on each elementary part but shorter than them and projecting less far.

3. The assembly claimed in claim 2 wherein said abutments include internal ribs for retaining by wedging said truncated additional part in said elementary part at the first end of said other modular support.

4. An assembly as claimed in claim 3 including a member for locking said truncated additional part in said elementary part of said other modular support, said member being one of said modules held on said assembly face of said elementary part.

5. The assembly claimed in claim 2 wherein said truncated additional part is discontinuous along the adjacent elementary part of said modular support and is divided into individual teeth defining said projecting studs.

6. The assembly claimed in claim 1 wherein said abutments on said elementary part of said first end of each modular support are hollow and open onto said assembly face of said elementary part.

7. An assembly as claimed in claim 6 including lateral openings on said abutments along said first end.

8. The assembly claimed in claim 6 wherein said hinges are discontinuous.

9. The assembly claimed in claim 1 wherein said abutments are delimited by flats inclined at substantially 45° and intersecting at an edge parallel to said hinges and are associated with means for locking each elementary part.

10. The assembly claimed in claim 1 wherein each modular support has an even number of successive elementary parts, this even number being in particular 2.

* * * * *